(12) United States Patent
Yamada et al.

(10) Patent No.: US 7,046,275 B1
(45) Date of Patent: May 16, 2006

(54) DIGITAL CAMERA AND IMAGING METHOD

(75) Inventors: Hirohisa Yamada, Ohta-ku (JP); Hiroki Fukuoka, Yokohama (JP); Tatsuo Okuda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/418,503

(22) Filed: Oct. 15, 1999

(30) Foreign Application Priority Data

Oct. 15, 1998 (JP) .............................. 10-294317
Sep. 1, 1999 (JP) .............................. 11-247234

(51) Int. Cl.
*H04N 5/225* (2006.01)
*H04N 5/222* (2006.01)

(52) U.S. Cl. .................. 348/220.1; 348/333.01; 348/333.12

(58) Field of Classification Search ............ 348/231.2, 348/333.03, 333.12, 333.13, 220.1, 333.01
See application file for complete search history.

(56) References Cited

U.S. PATENT DOCUMENTS

| 5,333,027 | A | * | 7/1994 | Matsushima | ................ 396/130 |
| 5,436,657 | A | | 7/1995 | Fukuoka | |
| 5,486,893 | A | * | 1/1996 | Takagi | ................ 396/147 |
| 5,576,759 | A | * | 11/1996 | Kawamura et al. | .... 348/207.99 |
| 5,806,072 | A | * | 9/1998 | Kuba et al. | ............... 348/231.2 |
| 5,960,155 | A | | 9/1999 | Fukuoka et al. | |
| RE36,338 | E | | 10/1999 | Fukuoka | |
| 6,104,430 | A | | 8/2000 | Fukuoka | |
| 6,342,900 | B1 | * | 1/2002 | Ejima et al. | ........... 348/333.01 |
| 6,677,991 | B1 | * | 1/2004 | Ito | ......................... 348/220.1 |

OTHER PUBLICATIONS

U.S. Appl. No. 09/418,503, filed Oct. 15, 1999, Pending.
U.S. Appl. No. 09/722,325, filed Nov. 28, 2000, Pending.
U.S. Appl. No. 09/418,503, filed Oct. 15, 1999, Pending.
U.S. Appl. No. 09/790,664, filed Feb. 23, 2001, Pending.
U.S. Appl. No. 09/418,503, filed Oct. 15, 1999, Yamada et al.
U.S. Appl. No. 10/458,229, filed Jun. 11, 2003, Okuda.

* cited by examiner

*Primary Examiner*—Thai Tran
*Assistant Examiner*—Luong T. Nguyen
(74) *Attorney, Agent, or Firm*—Oblon, Spivak, McClelland, Maier & Neustadt, P.C.

(57) ABSTRACT

Digital camera and method are configured to operate in various photographic modes of operation that capture a sequence of images. The sequence of images is stored in memory, and selected of the stored images are retrieved from memory and automatically displayed after the sequence of images has been captured. The images are viewed on a on-camera display that is automatically turned on at the conclusion of the capturing of the sequence of images. A duration of the image display time is user-settable.

53 Claims, 16 Drawing Sheets

OFF

OFF

ON

OFF

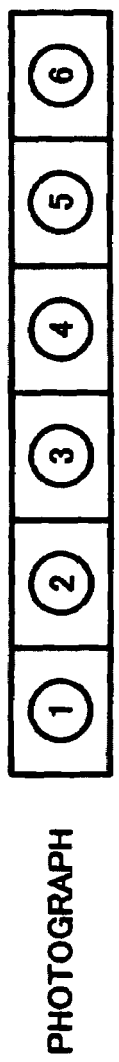
FIG. 7A  PHOTOGRAPH
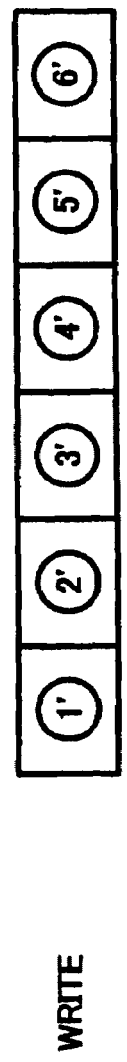
FIG. 7B  WRITE
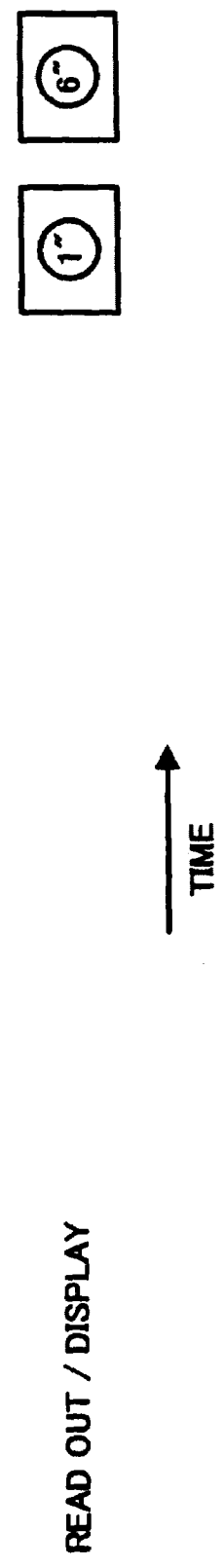
FIG. 7C  READ OUT / DISPLAY

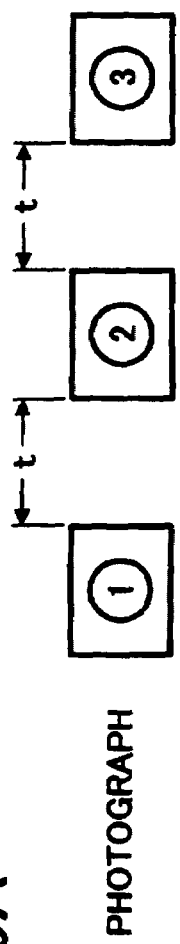
FIG. 9A PHOTOGRAPH
FIG. 9B WRITE
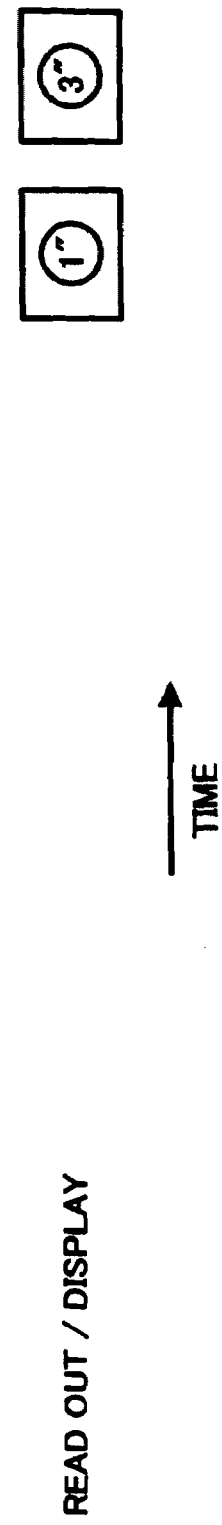
FIG. 9C READ OUT / DISPLAY

PHOTOGRAPH

WRITE

READ OUT / DISPLAY

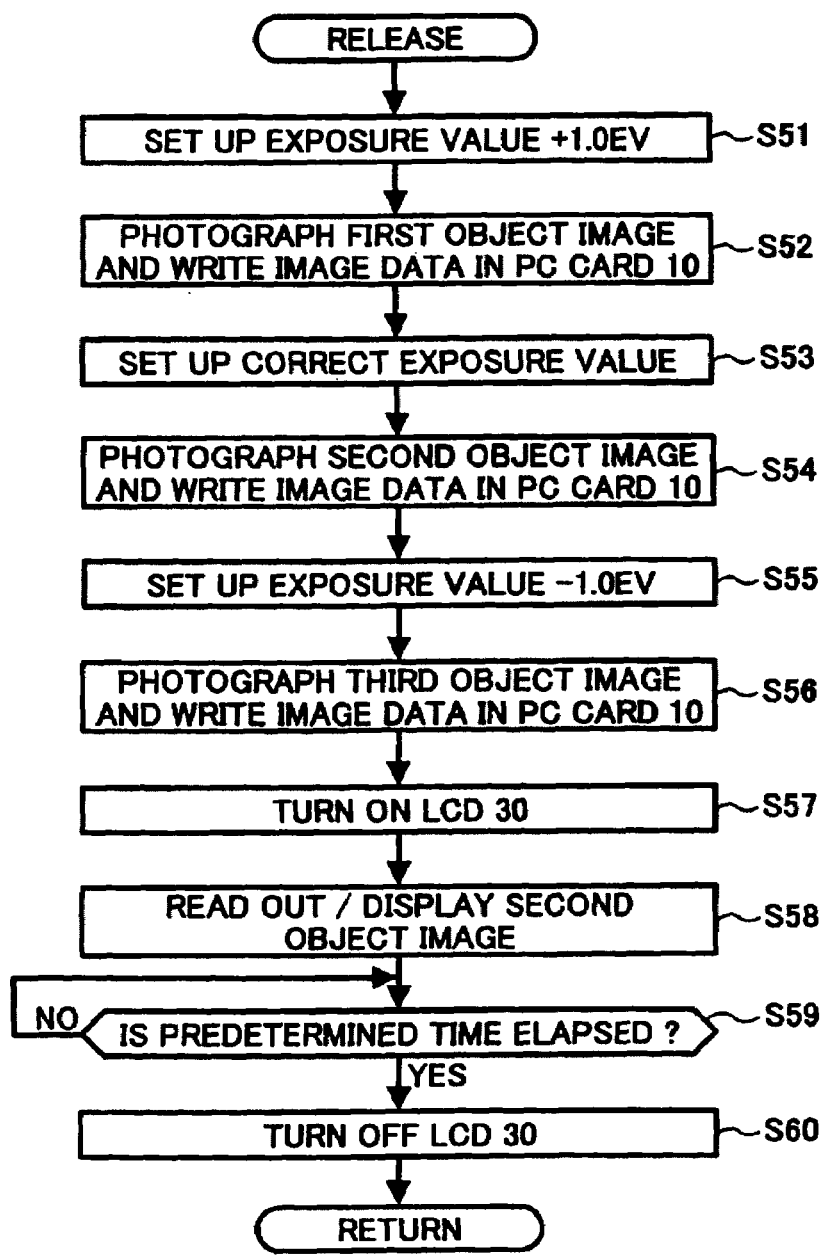

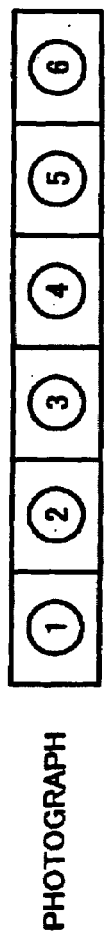
FIG. 13A  PHOTOGRAPH
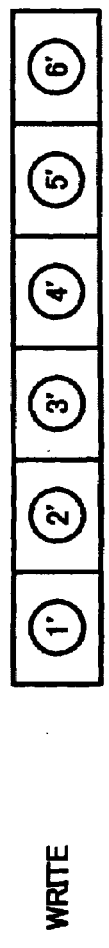
FIG. 13B  WRITE
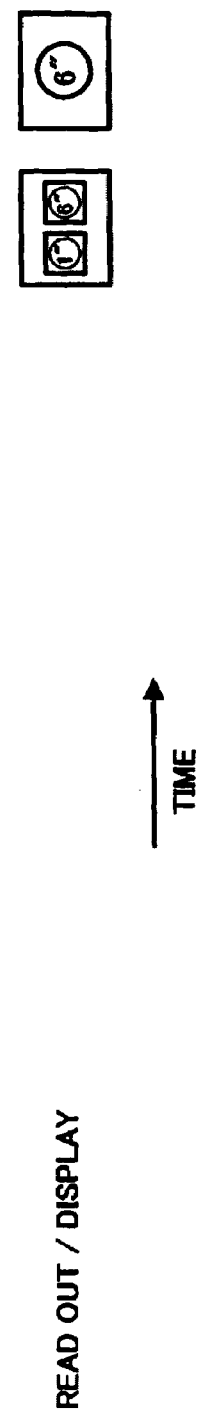
FIG. 13C  READ OUT / DISPLAY
TIME

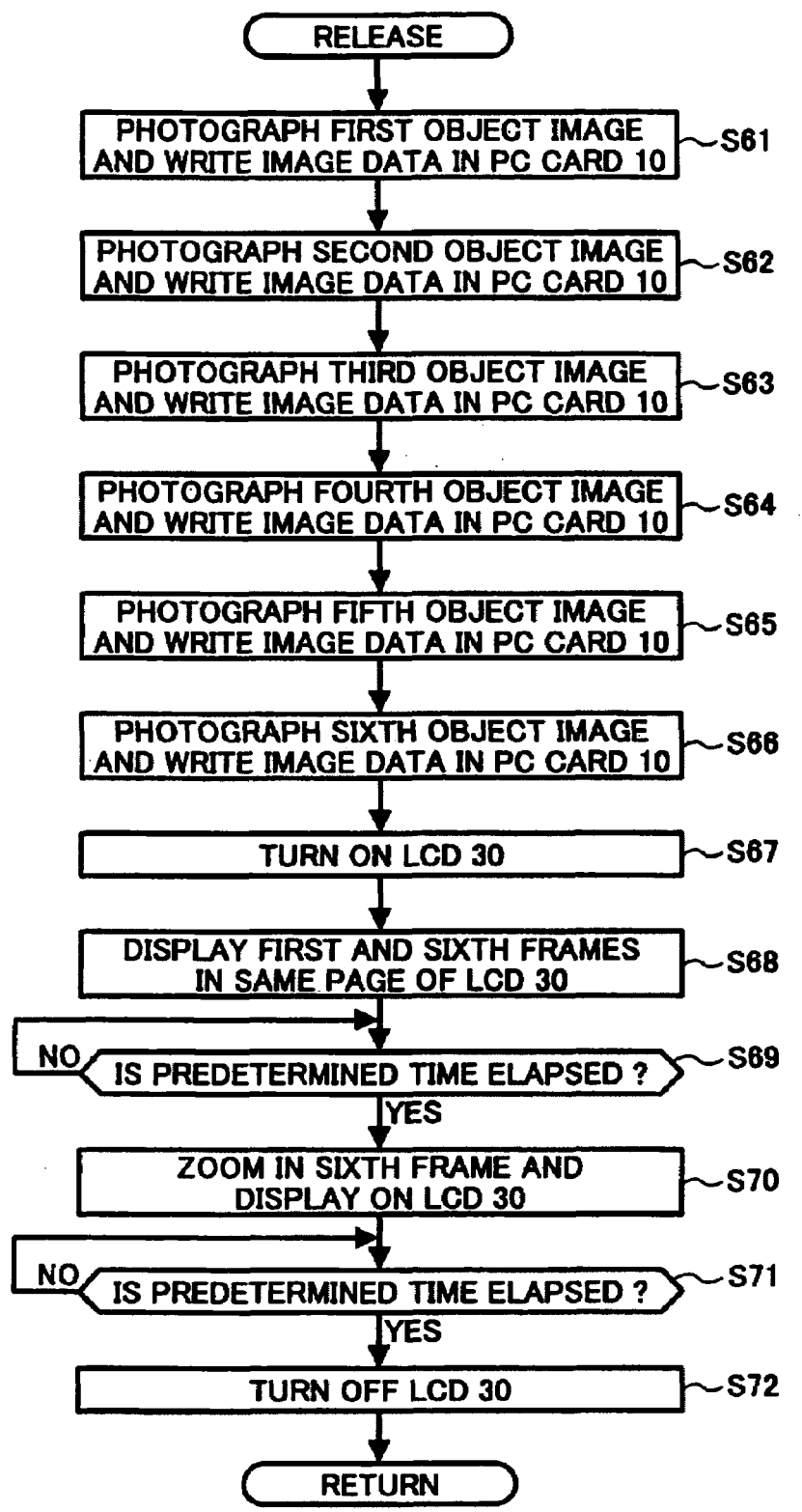

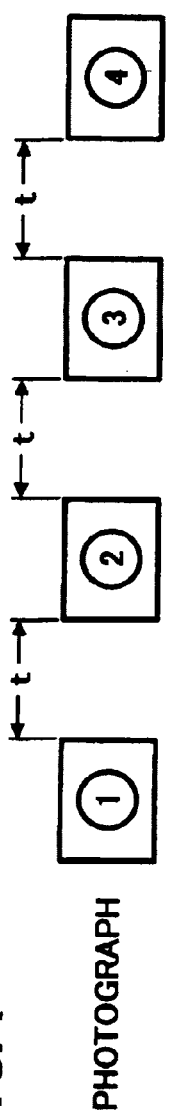
FIG. 15A PHOTOGRAPH
FIG. 15B WRITE
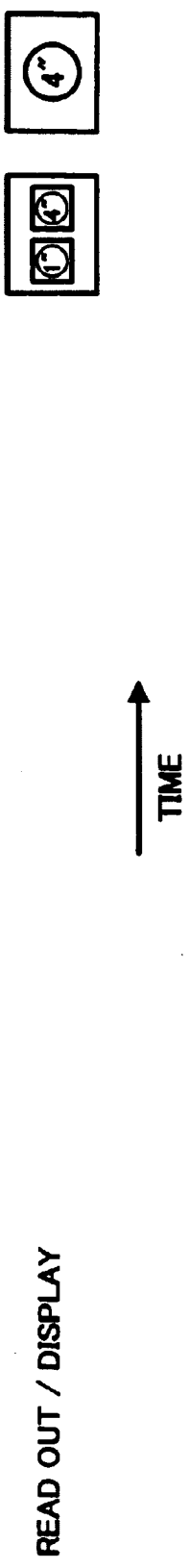
FIG. 15C READ OUT / DISPLAY

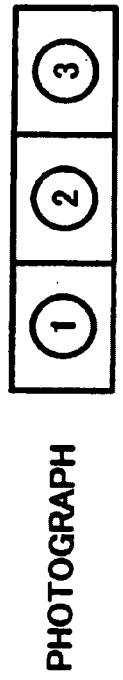
FIG. 17A PHOTOGRAPH
FIG. 17B WRITE
FIG. 17C READ OUT / DISPLAY
TIME

DIGITAL CAMERA AND IMAGING METHOD

BACKGROUND OF THE INVENTION

1. Field of the Invention

The present invention relates to a digital camera and imaging method that stores image information obtained by an imaging device in a recording medium and more particularly to a power-thrifty digital camera, which controls power consumption of a battery or the like.

2. Discussion of the Background

A camera using a photographic film (i.e. a silver halide film camera) has been generally used for photography. Recently, digital cameras have become increasingly widespread. In the digital cameras, an object image is photographed by a solid-state imaging device, such as a charged coupled device (CCD) or the like, and image data of the object image, such as static images (still images) and moving images (movie images), are obtained and digitally recorded in an IC (integrated circuit) card, such as a printed circuit (PC) card with semiconductor memory, a video floppy disk, or the like.

Digital cameras have many photographing modes for imaging objects by the solid-state imaging device other than a normal photographing mode in which a single static image is obtained every time a shutter releases. These modes include the following: (1) a continuous shoot mode in which multiple static images are successively obtained at a predetermined time interval when the an operator continuously depresses a shutter release device; (2) an auto bracketing mode in which a same static image is photographed with different predetermined multiple exposure values corresponding to a shutter release operation; and (3) a movie capture mode in which moving images are obtained each time the shutter releases in response to the shutter release device being continuously depressed. In the above-described digital camera, almost all functions, except for optical sub-systems are digitally performed, e.g., basic photographing functions, add-on accessory functions, etc.

In the digital camera, much electric power tends to be consumed for supporting components, which include an imaging device, a lens driving motor, an electronic flash, a display part, etc. As the digital camera is usually equipped as a portable device for photographing various events, battery power, such as a primary cell and a storage cell, is used as a main operation power. When the battery gets weak, the digital camera loses its ability to function and cannot continue to photograph without the assistance of a spare battery. For example, the digital camera may continue to operate on four AA batteries for 20 to 40 minutes, and for 1 to 2 hours on a lithium battery. However, the present invention attempts to increase operational time by reducing the consumption of electric power as much as possible in the digital camera.

Various methods have been employed to reduce the consumption of electric power. For example, in non-photographing modes, especially when photographed image data are read out, displayed and transmitted to other devices, such as a computer, the digital camera is made to use auxiliary power sources such as utility AC (alternating current) power from an electrical outlet, a car battery via an AC adapter or the like. Further, in order to reduce the consumption of electric power in the photographing mode, the power source is automatically turned off after a predetermined time has elapsed while the camera operated in a standby condition. Furthermore, indications such as displays or lights corresponding to functions that are not used in an active operational mode are selectively turned off.

Recently, the number of digital cameras having a liquid crystal display (hereinafter referred to as an LCD) has increased. In such digital cameras, the LCD is used to display photographed images and is used as an electronic viewfinder in a photographing mode. However, the LCD consumes much electric power, not only for driving a display, but also for backlighting for a translucent display. Therefore, the inventors recognize that it is preferable for saving electric power to use an optical viewfinder instead of a LCD electronic viewfinder in a photographing mode.

When an operator photographs an image with the optical viewfinder, the operator often has a demand for viewing the photographed image at that moment. As a result, the operator displays the photographed image on the LCD right after photographing and checks the image.

However, performing display operations every time an image is photographed becomes a burden on the operator. Further, there are concerns about increasing the consumption of the battery power resulting from driving the LCD for a long time.

SUMMARY OF THE INVENTION

Accordingly, it is an object of the present invention to address the above-identified, and other, limitations with conventional devices and methods. The following brief description is a synopsis of only selected features and attributes of the present system and method. A more complete description of the invention is found below in the section entitled "Description of the Preferred Embodiments".

A digital camera and method according to the present invention are configured to operate in various photographic modes of operation that capture a sequence of images. The sequence of images is stored in memory, and selected of the stored images are retrieved from memory and automatically displayed after the sequence of images has been captured. The images are viewed on a on-camera display that is automatically turned on at the conclusion of the capturing of the sequence of images. A duration of the image display time is user-settable.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIGS. 7a–7c provide an explanatory illustration of a series of photographs being captured, stored, and displayed;

FIGS. 9a–9c are illustrative views of a continuous shoot mode of operation;

FIG. 12 is a flow chart showing process steps performed in the bracketing mode of operation and subsequent image display and LCD control operations;

FIGS. 13a–13c provide an exemplary view of a movie capture mode of operation with a subsequent multiple display operation;

FIG. 14 is a flow chart of process steps performed in the movie capture mode in multiple display operation described in FIGS. 13a–13c;

FIGS. 15a–15c describe exemplary views of a continuous shoot mode of operation in which multiple static images are consecutively photographed at a predetermined time interval and read-out in a multiple display mode;

FIGS. 17a–17c are explanatory views of an autobracketing mode of operation followed by a multi-display operation.

DESCRIPTION OF THE PREFERRED EMBODIMENTS

Figure 1:
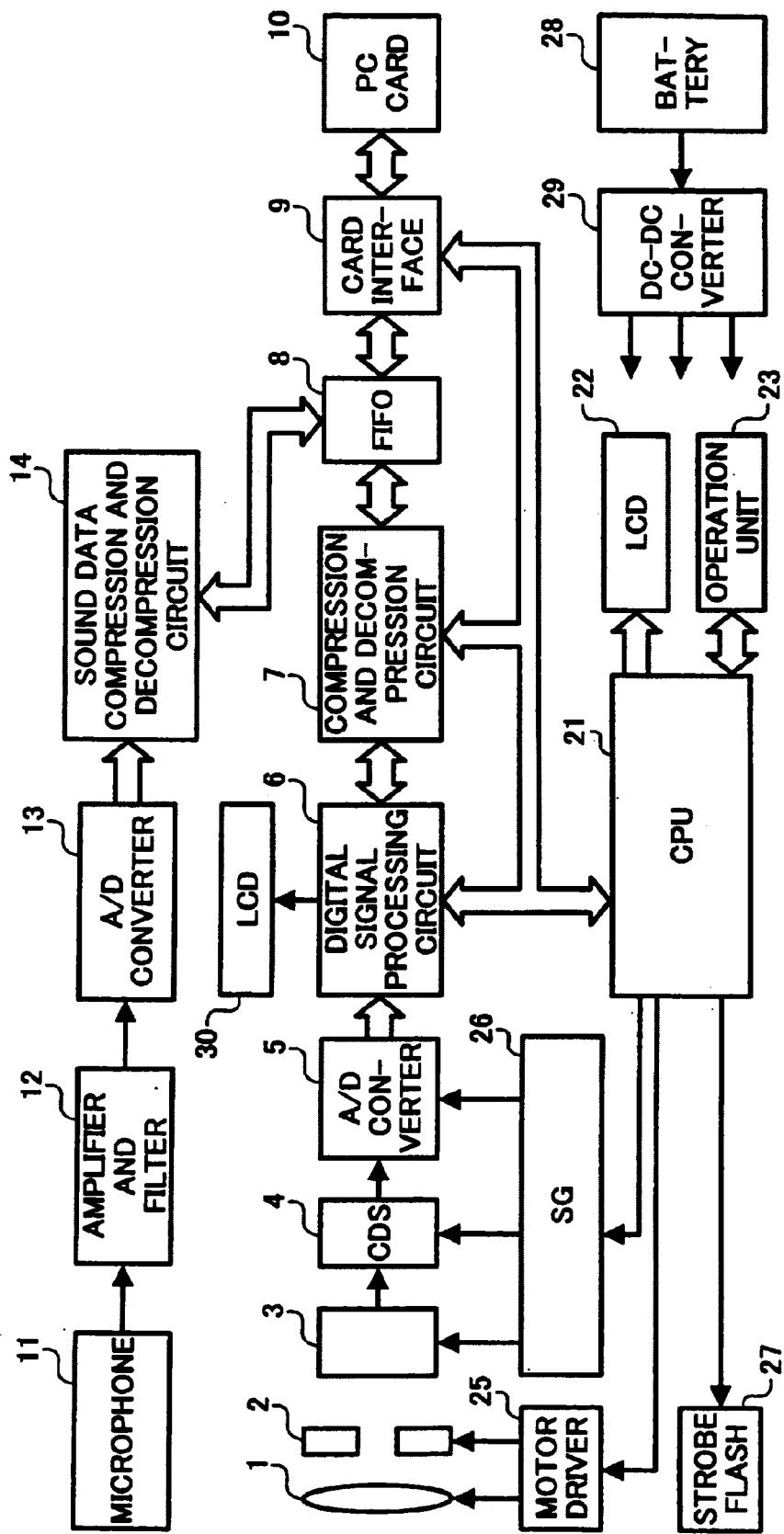
FIG. 1 is a block diagram of a digital camera 1 according to an embodiment 1 of the present invention.

Referring now to the drawings, wherein like reference numerals designate identical or corresponding parts throughout the several views, and more particularly to FIG. 1 thereof, a block diagram showing an overall construction of a digital camera according to the present invention is illustrated. The exemplary digital camera according to the embodiments of the present invention photographs not only static images in a normal photographing mode, a continuous shoot mode, and an auto bracketing mode, but also moving images in a movie capture mode in which moving image and sound data for a short time is recorded.

A digital camera illustrated in FIG. 1 includes a lens system 1, a shutter mechanism 2, a charge coupled device (CCD) 3, a correlate dual sampling (CDS) circuit 4, a first analog to digital (A/D) converter 5, a digital signal processing circuit 6, a compression and decompression circuit 7, a first-in first-out (FIFO) 8, a card interface (I/F) 9, a PC card 10, a microphone 11, an amplifier and filter (AMP/FILTER) 12, a second analog to digital (A/D) converter 13, a sound data compression and decompression circuit 14, a central processing unit (CPU) 21, a first liquid crystal display (LCD) 22, an operation unit 23, a motor driver 25, a signal generator (SG) 26, a strobe flash 27, a battery 28, a DC—DC converter 29, and a second liquid crystal display (LCD) 30. Signal paths between the above-described components are shown above.

A photographic optical system for image focusing includes the lens system 1 and the shutter mechanism 2. The shutter mechanism 2 includes an auto focus (AF), an aperture, and a filter mechanism, and controls an exposure time when a shutter is released. As an imaging device, the CCD 3 is used in this embodiment. The CCD 3 converts optical images, which are imaged through the photographic optical system, into electrical signals.

A photograph process device includes the CDS circuit 4, the A/D converter 5, a digital signal processing circuit 6, a compression and decompression circuit 7, the FIFO 8, and the CPU 21.

A read out/display device includes the digital signal processing circuit 6, the compression and decompression circuit 7, the FIFO 8, the CPU 21, and the LCD 30.

The CDS circuit 4 reduces noise in the electrical signals output from the CCD 3. The A/D converter 5 converts the analog image signals, which are input thereto from the CCD 3 through the CDS circuit 4, into digital image data. In further detail, the A/D converter 5 converts the signals output from the CCD 3 to digital signals through the CDS circuit 4 with an optimum sampling frequency.

The digital signal processing circuit 6 separates the digital image data, which is input thereto from the A/D converter 5, into color-difference data and luminance data, and then performs various processes on the separated data including processes for correcting and compression/decompression. The compression/decompression circuit 7 compresses the image data with, e.g., an orthogonal transformation and a Huffman encoding, and then decompresses the image data with, e.g., a corresponding Huffman decoding and an inverse orthogonal transformation, e.g., in conformity with the Joint Photographic Expert Group (JPEG) standard.

Sound is converted to electrical signals by the microphone 11. In the AMP/FILTER 12, the sound signals in a predetermined band are passed through the AMP/FILTER 12 and are selectively amplified. The A/D converter 13 then converts the sound signals which have passed through the AMP/FILTER 12 to digital sound data with a sampling frequency which is more than double the frequency of the predetermined band. Then, the sound data compression and decompression circuit 14 compresses and encodes the digital sound data.

The FIFO 8 is a temporary memory device, such as a dynamic random access memory (DRAM), static ram, a flash memory, or the like. The FIFO 8 temporarily stores compressed image data and sound data therein. The compressed image data and sound data are read out by the card interface 9, and are recorded in the PC card 10 serving as a record medium which connects to the card interface 9. The PC card 10 contains semiconductor memory, or a recognized equivalent, for recording the information.

The CPU 21 controls operations of each unit of the digital camera according to instructions from the operation unit 23. The LCD 30 displays an image of digital image data of a photograph just taken or an image of image data which is decompressed and read out with a single frame, or double or triple frames (multiple display) in the same page of the LCD 30. The LCD 30 further displays messages indicating operational conditions of the digital camera, such as a normal photographing mode, a movie capture mode, a continuous shoot mode, and an auto bracketing mode. For inspection by the operator, the LCD 22 also displays the above-described operational conditions (i.e. the four photographing modes of the digital camera).

The operation unit 23 includes an operation device, such as a release button for inputting a photographing instruction, a function selection button for selecting desired functions, a mode selection button for selecting the normal photographing mode, the movie capture mode, the continuous shoot mode, and the auto bracketing mode, a switch button, and a setting button for setting other various photographing conditions.

The motor driver 25 drives the photographing lens system 1 and the shutter mechanism 2 according to a control signal provided by the CPU 21. The SG 26 generates drive control signals such as clock signals, and provides the drive control signals to the CCD 3, CDS circuit 4, and A/D converter 5.

The strobe flash 27 is controlled by the CPU 21 and is flashed when the shutter mechanism 2 is released, and which illuminates an object image.

A power unit of the digital camera includes the battery 28 and the DC—DC converter 29. As the battery 28, a nickel cadmium battery, a nickel hydrogen battery, or a lithium battery is used. The voltage is converted to an appropriate level by the DC—DC converter 29 to be supplied to the whole system of the digital camera.

As described later in FIGS. 3 through 6, the digital camera according to the embodiments includes an optical viewfinder (the optical viewfinder is designated by a reference character F in FIGS. 3 through 6) to optically check a picture view. An operator operates the operation unit 23 and takes photographs while looking through the optical viewfinder. Because the optical viewfinder is provided, the CPU 21 is able to turn off an image display on the LCD 30 in a photograph standby condition in either of the normal photographing mode, the continuous shoot mode, the auto bracketing mode, and the movie capture mode. The CPU 21 actuates the strobe flash 27 to generate a flash if necessary corresponding to a release operation by a release button 23a of the operation unit 23, and which controls the shutter mechanism 2 to open and photograph an object image by the CCD 3 and then write image data in the PC card 10 via the digital signal processing circuit 6.

For example, in the normal photographing mode, after the above-described writing of the image data in the PC card 10, the CPU 21 turns on the LCD 30 promptly to display the image written in the PC card on the LCD 30. The CPU 21 further maintains control of the display by displaying the image for a predetermined period of time, e.g., one or two seconds, and then to turn off the image display on the LCD 30. The predetermined period of time may be a user-set parameter for enabling an image to be displayed for up to several minutes. Thus, the CPU 21 also functions as a display time controlled device. An operator can check the result of photograph in one or two seconds in which the photographed image is displayed on the LCD 30. The period for displaying the photographed image on the LCD 30 can be set at the operation unit 23 to the desired period. Alternatively, in the normal photographing mode, the operator may choose to take several photographs in rapid sequence. In this case, the operator has insufficient time to inspect each photograph before taking the next one in sequence. Accordingly, the CPU 21 measures a time lag between different photographing events, and if the time lag is sufficiently short, the CPU 21 opts not to display the photographs until the measured time lag exceeds a predetermined time interval, e.g. 5 seconds. Once the predetermined time interval has been observed, the first and the last photographs of the sequence are displayed simultaneously. Alternatively, the first and last photographs are displayed one after another.

Generally, operators like to check the result of a photograph operation just after taking photographs for both still images and moving images. Therefore, the photographed images are automatically displayed only just after photographing. Other than the above-described case, the LCD 30 is turned off to avoid unnecessary electric power consumption. When the operator desires to check the result of the photograph operation after many hours have elapsed, the operator can selectively display the photographed images on the LCD 30 for a desired time.

Referring to FIGS. 2 through 6, a photographing control operation of the CPU 21 according to the first embodiment, in which the normal photographing mode is selected, is explained.

Figure 3:
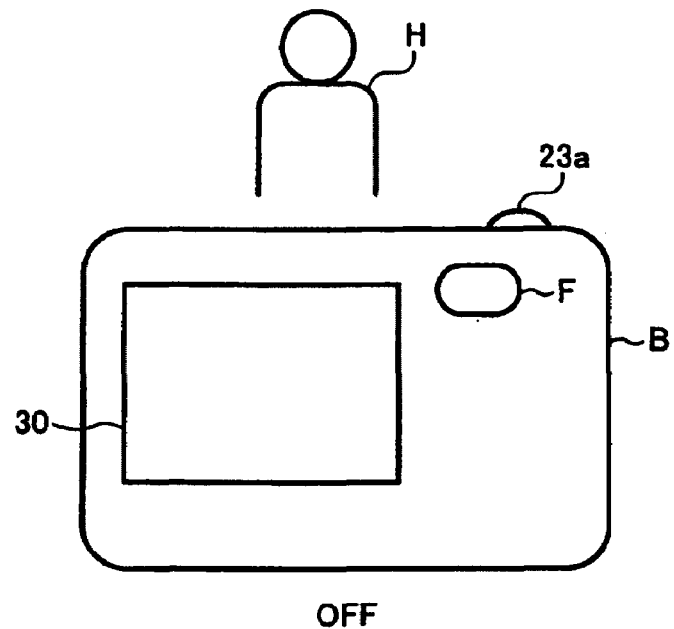
FIGS. 3–6 are illustrative views of an optical view finder and on-camera display device, illustrating how the captured images displayed on the camera's on-camera display device after being captured.
Figure 4:
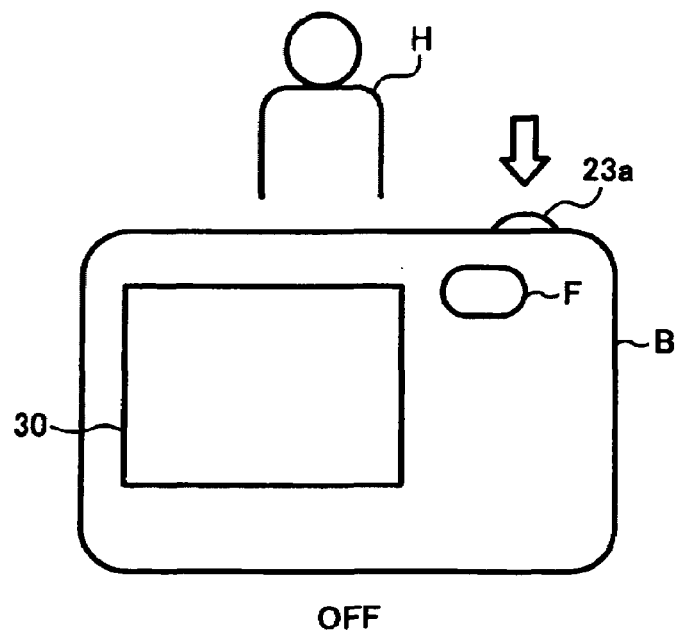

As illustrated in FIG. 3, when the digital camera is in a standby condition, the LCD 30 is off and image data are not displayed thereon. Referring further to FIG. 4, an operator holds a body B of the digital camera and watches an object H through an optical viewfinder F with composition and timing adjusted, and pushes the release button 23a of the operation unit 23.

Figure 2:
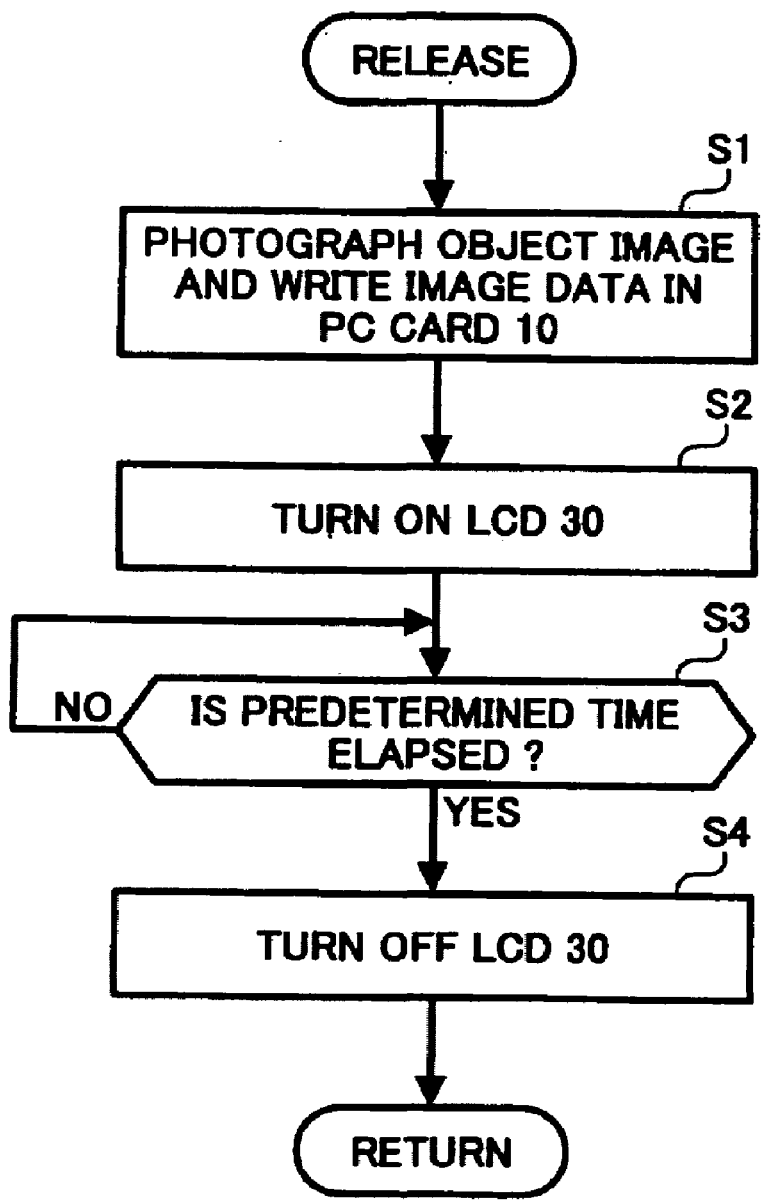
FIG. 2 is a flowchart of a method for controlling an on-camera display.
Figure 5:
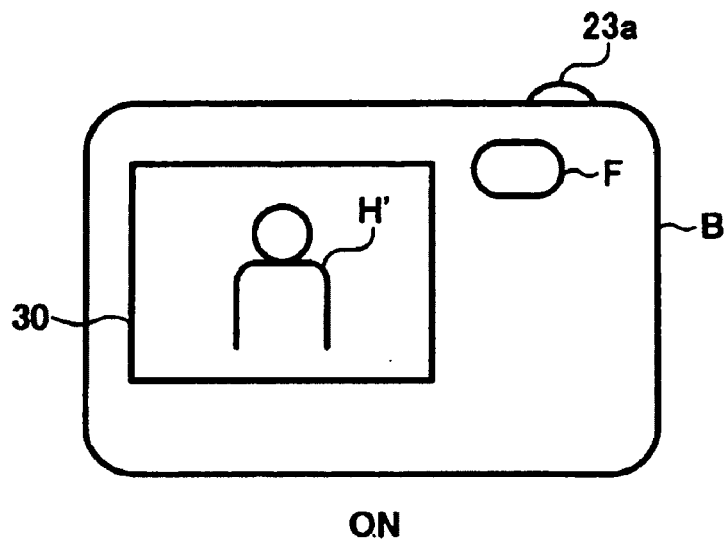

When the release button 23a is pushed, a normal photographing mode operation in a flowchart of FIG. 2 starts, an operation that is employed in conventional cameras, such as Kodak's DC260 and DC220. The CPU 21 controls the strobe flash 27 to flash if necessary, an auto focus function, open the shutter mechanism 2, photograph an object image by the CCD 3, and to write image data in the PC card 10 via the digital signal processing circuit 6 in step S1. Right after writing the image data, the CPU 21 controls the LCD 30 to turn on and to read out/display the image data of a photographed object H' thereon as illustrated in FIG. 5 in step S2. An operator checks the result of photograph on the LCD 30 at this time.

Figure 6:
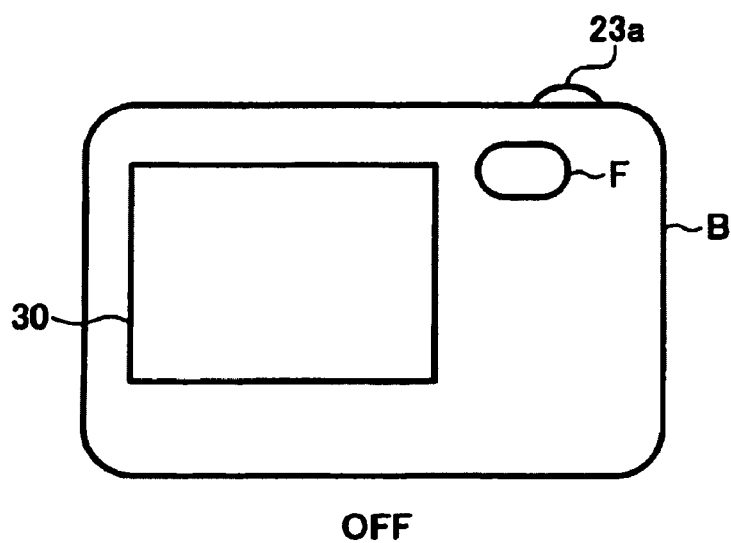

Next, the CPU 21 judges if a predetermined time, for example, one or two seconds, has elapsed after the image data of the photographed object H' is displayed on the LCD 30 in step S3. If the answer is YES in step S3, the CPU 21 controls the LCD 30 to turn off in step S4, and the digital camera returns to the standby condition. FIG. 6 illustrates the condition of the digital camera in which the LCD 30 is off and the digital camera returns to the standby condition. If the answer is NO in step S3, the normal photographing mode operation reexecutes step S3.

Referring to FIGS. 7a–7c and 8, a second embodiment of the present invention is described. FIGS. 7a–7c and 8 are an explanatory view and a flowchart, respectively, for a movie capture mode operation in which images of, for example, 30 frames per second are obtained while pushing the release button 23a of the operation unit 23.

FIG. 7a illustrates a view when six images from the first to sixth frame are consecutively photographed. FIG. 7b illustrates a view when the moving image information of the first through sixth frames photographed in FIG. 7a is written to the PC card 10 by the photograph process device. FIG. 7c illustrates a view when the first frame and the last frame (the sixth frame) out of the written six frames in FIG. 7b are read out and displayed successively on the LCD 30 by the operation of the read out/display device in accordance with the instruction of the display time control device.

As illustrated in FIG. 3, when the digital camera is in a standby condition, the LCD 30 remains off so image data is not displayed thereon. As described in FIG. 4, an operator holds the body B of the digital camera and watches the object H through the optical viewfinder F with composition and timing adjusted, and pushes the release button 23a of the operation unit 23.

Figure 8:
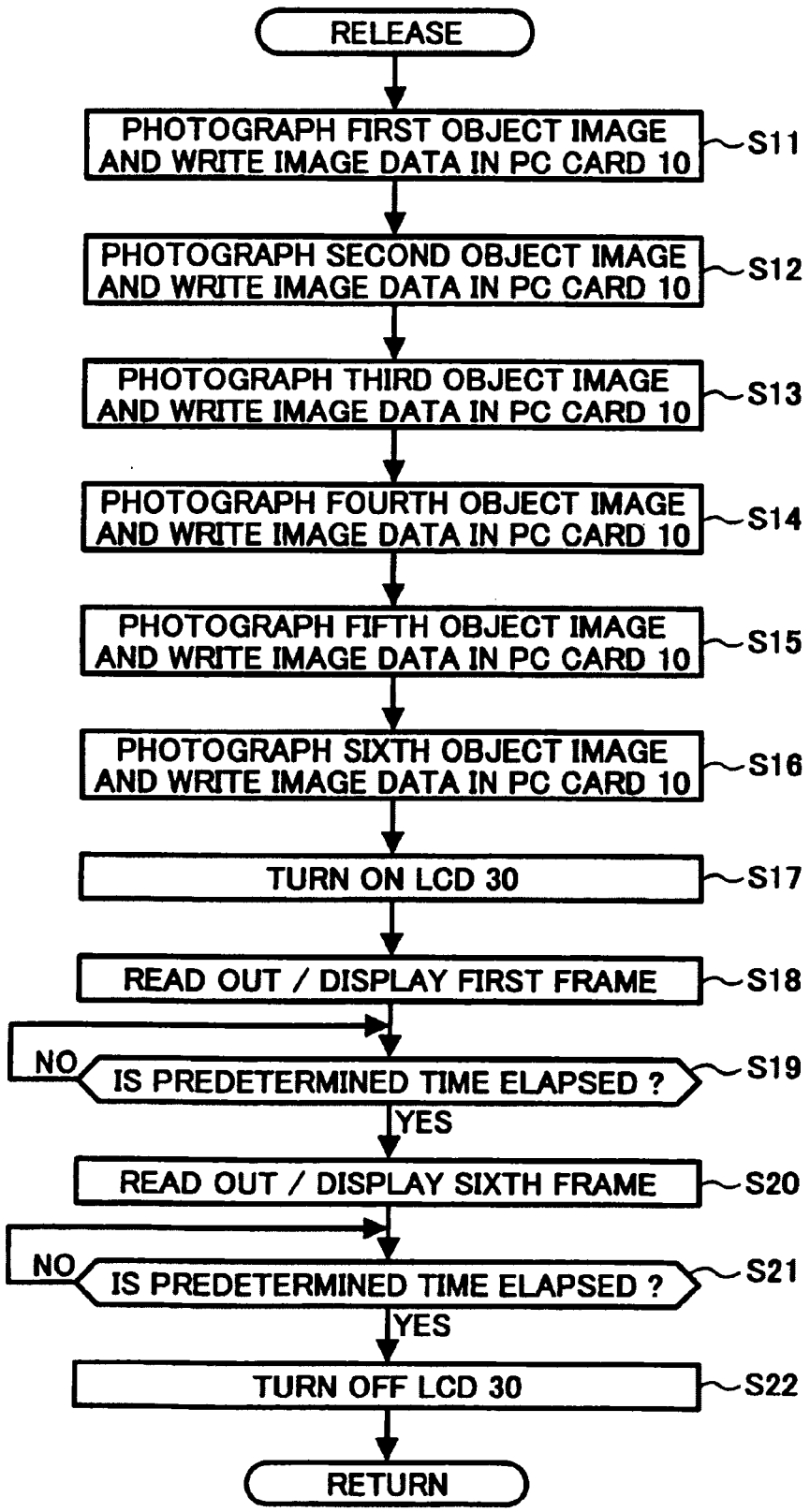
FIG. 8 is a flowchart describing a process flow for coordinating a movie capture mode of operation and subsequent display and LCD control operations.

When the release button 23a is pushed, a movie capture mode operation in a flowchart of FIG. 8 starts. The CPU 21 controls to flash the strobe flash 27 if necessary, to operate an auto focus function, to open the shutter mechanism 2, to photograph object images of the first through sixth frames consecutively by the CCD 3, and to write image data consecutively in the PC card 10 via the digital signal processing circuit 6 in steps S17 through S16. Right after writing the image data, the CPU 21 turns on the LCD 30 in step S17 and reads out/displays the first written object image out of the six image data (i.e. the first frame 1" in FIG. 7C) on the LCD in step S18. An operator checks the result of the photographed first frame 1" on the LCD 30 at this time. Next, the CPU 21 judges if a predetermined time is elapsed after the first frame 1" is displayed on the LCD 30 in step S19. If the answer is YES in step S19, the CPU 21 controls a read out/display operation of the sixth object image (i.e. the six frame 6" in FIG. 7C) on the LCD 30 in step S20. If the answer is NO in step S19, the movie capture mode operation returns so as to reexecute before step S19. The CPU 21 further judges if a predetermined time is elapsed after the six frame 6", is displayed on the LCD 30 in step S21. If the answer is YES in step S21, the CPU 21 turns off the LCD 30 in step S22 and the digital camera returns to the standby condition.

Referring to FIGS. 9a–9c and 10, a third embodiment of the present invention is described. FIGS. 9a–9c and 10 are an explanatory view and a flowchart, respectively, of a continuous shoot mode operation in which multiple static images are consecutively photographed at a predetermined time interval (t) while continuously pushing the release button 23a of the operation unit 23.

FIG. 9a illustrates a view when three images from the first to third frame are consecutively photographed. FIG. 9b illustrates a view when the static image information of the first through third frame photographed in FIG. 9a is written to the PC card 10 by the photograph process device. FIG. 9c illustrates a view when the first frame and the last frame (the third frame) out of the written three frames in FIG. 9b are read out and displayed successively on the LCD 30 by the operation of the read out/display device in accordance with the instruction of the display time control device.

Figure 10:
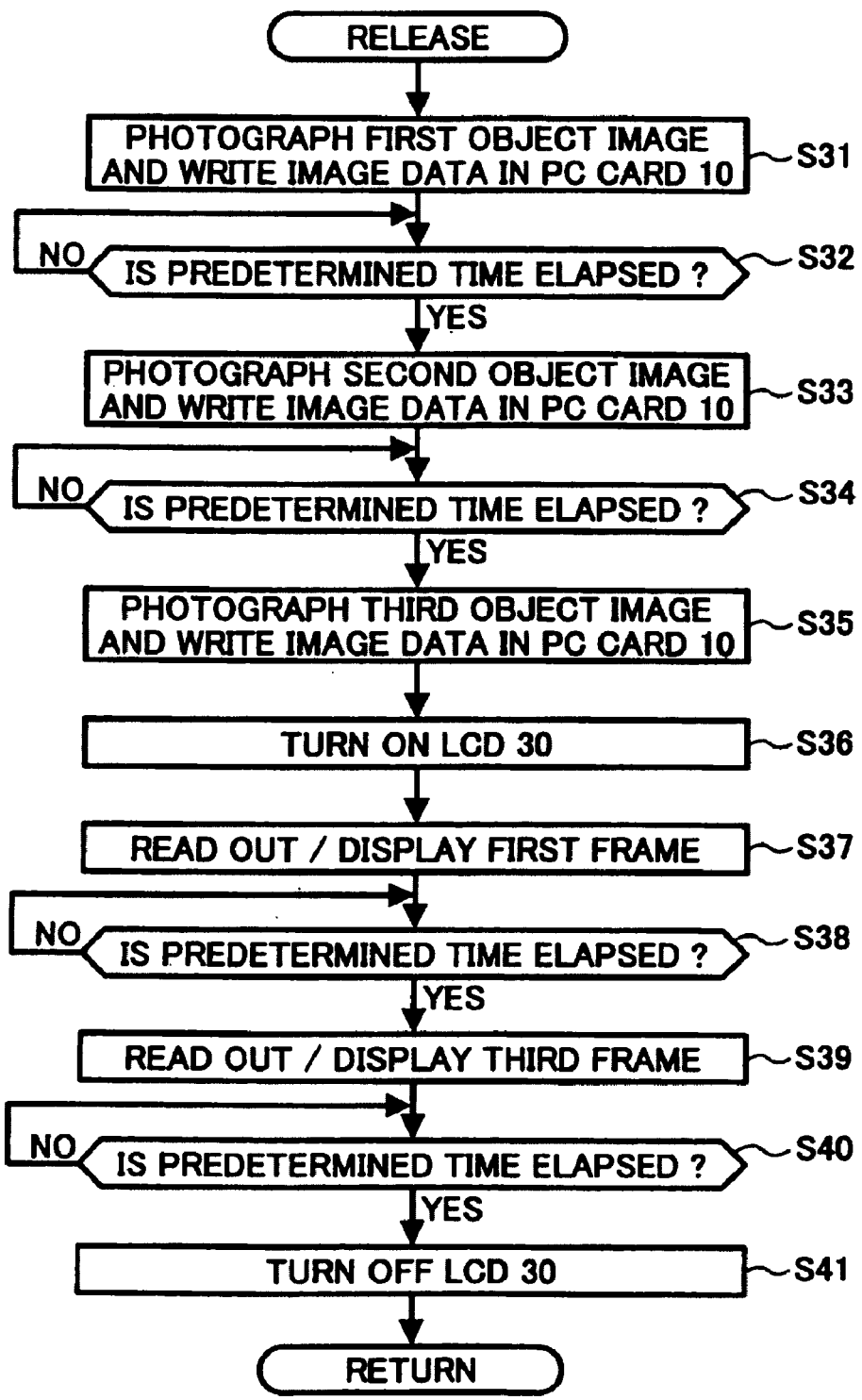
FIG. 10 is a flowchart of process steps carried out in a continuous shoot mode of operation followed by subsequent display and LCD control operations.

Referring to the flowchart in FIG. 10, the continuous shoot mode operation controlled by the CPU 21 of the digital camera according to the third embodiment of this invention is explained. In the flowchart in FIG. 10, as the continuous shoot mode is already selected by the mode selection button, the continuous shoot mode operation starts upon pushing the release button 23a of the operation unit 23.

When the release button 23a is pushed, the continuous shoot mode operation in the flowchart of FIG. 10 starts. The CPU 21 controls the strobe flash 27 to flash if necessary, operate an auto focus function, open the shutter mechanism 2, photograph an object image of the first frame by the CCD 3, and write image data in the PC card 10 via the digital signal processing circuit 6 in step S31. Next, the CPU 21 judges if a predetermined time is elapsed after the first frame is photographed in step S32. The above-described time is preset by an operator. If the answer is YES in step S32, the second frame is photographed and its image data is written in the PC card 10 in step S33, just like step S31. If the answer is NO in step S32, the continuous shoot mode operation returns to reexecute step S32. The CPU 21 further judges if a predetermined time is elapsed after the second frame is photographed in step S34 like step S32. If the answer is YES in step S34, the third frame is photographed and its image data is written in the PC card 10 in step S35, like steps S31 and S33. Next, the CPU 21 controls the LCD 30 in step S36 to turn on and to read out/display the first written object image (i.e. the first frame 1" in FIG. 9C) on the LCD 30 in step S37. An operator checks the result of the photographed first frame 1" on the LCD 30 at this time.

The CPU 21 judges if a predetermined time is elapsed after the first frame 1" is displayed on the LCD 30 in step S38. If the answer is YES in step S38, the CPU 21 controls a read out/display operation of the third object image (i.e. the third frame 3" in FIG. 9c) on the LCD 30 in step S39. If the answer is NO in step S38, the continuous shoot mode operation returns to reexecute step S38. The CPU 21 further judges if a predetermined time is elapsed after the third frame 3" is displayed on the LCD 30 in step S40. If the answer is YES in step S40, the CPU 21 controls the LCD 30 in step S41 to turn off and the digital camera returns to the standby condition.

Referring to FIGS. 11a–11c and 12, a fourth embodiment of the present invention is described. FIGS. 11a–11c and 12 are an explanatory view and a flowchart, respectively, for an auto bracketing mode operation in which a same static image is photographed with different predetermined multiple exposure values, e.g., +1.0 EV (exposure value) overexposure, correct exposure, and −1.0 EV underexposure, corresponding to a push operation of the release button 23a of the operation unit 23.

Figure 11A:
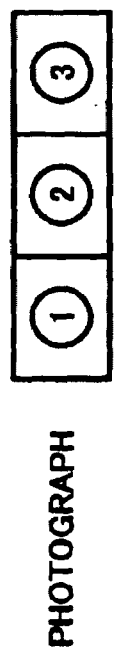
FIGS. 11a–11c are explanatory views of a bracketing mode of operation.
Figure 11B:
Figure 11C:
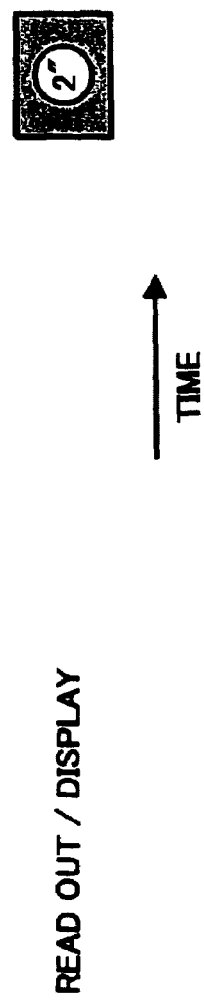

FIG. 11a illustrates a view when three images from the first to third frame are photographed. FIG. 11b illustrates a view when the static image information of the first through third frame photographed in FIG. 11a is written in the PC card 10 by the photograph process device. FIG. 11c illustrates a view when the second frame of correct exposure (i.e. the static image 2") out of the written three images in FIG. 11b (i.e. static image 1' of +1.0 EV overexposure, static image 2' of correct exposure, and static image 3' of −1.0 EV underexposure) is read out and displayed by the operation of the read out/display device in accordance with the instruction of the display time control device. Referring to the flowchart in FIG. 12, the auto bracketing mode operation controlled by the CPU 21 of the digital camera according to the fourth embodiment of this invention is explained. In the flowchart in FIG. 12, as the auto bracketing mode is already selected by the mode selection button, the auto bracketing mode operation starts upon pushing the release button 23a of the operation unit 23.

When the release button 23a is pushed, the auto bracketing mode operation in the flowchart of FIG. 12 starts. The CPU 21 controls to perform an exposure compensation operation (i.e. setting up an exposure value of, for example, +1.0 EV , (or +0.5 EV ), overexposure compared to the correct exposure) for the shutter mechanism 2 or an aperture mechanism (not shown) in step S51. The CPU 21 further controls the strobe flash 27 to flash if necessary, operate an auto focus function, to open the shutter mechanism 2, photograph an object image of the first frame by the CCD 3, and write image data in the PC card 10 via the digital signal processing circuit 6 in step S52.

Next, the CPU 21 further controls a correct exposure value to set up for the shutter mechanism 2 or the aperture mechanism (not shown) in step S53. Then, the CPU 21 controls the second frame to be photographed and write the corresponding image data in the PC card 10 in step S54, like step S52. Further, the CPU 21 controls an exposure value to be set up, for example, −1.0 EV (or −0.5 EV ) underexposure compared to the correct exposure for the shutter mechanism 2 or the aperture mechanism in step S55.

The CPU 21 controls the third frame to be photographed and its image data to be written to the PC card 10 in step S56 like steps S52 and S54.

Next, the CPU 21 controls the LCD 30 to turn on in step S57 and to read out/display the second written object image out of the three object images (i.e. the second frame 2") in FIG. 11c, on the LCD 30 in step S57. An operator may view the result of the photographed second frame 2" of the correct exposure on the LCD 30 at this time.

The CPU 21 judges if a predetermined time has elapsed after the second frame 2", is displayed on the LCD 30 in step S59. If the answer is YES in step S59, the CPU 21 controls the LCD 30 to turn off in step S60 and the digital camera returns to the standby condition. If the answer is NO in step S59, the auto bracketing mode operation returns to reexecute step S59.

Referring to FIGS. 13a–13c and 14, a fifth embodiment of the present invention is described. FIGS. 13a–13c and 14 are explanatory views and a flowchart, respectively, for the movie capture mode operation in which images of, for example, 30 frames per second are obtained while pushing the release button 23a of the operation unit 23.

FIG. 13a illustrates a view when six object images from the first to sixth frame are consecutively photographed. FIG. 13b illustrates a view when the moving image information of the first through sixth frames photographed in FIG. 13a is written in the PC card 10 by the photograph process device. FIG. 13c illustrates a view when the first frame 1" and the last frame (the sixth frame 6") are read out and simultaneously displayed in the same page of the LCD 30 (referred to as "multiple display") for a predetermined time by the operation of the read out/display device in accordance with the instruction of the display time control device, and the sixth frame 6" is zoomed in on the LCD 30.

Referring to the flowchart in FIG. 14, the movie capture mode operation controlled by the CPU 21 of the digital camera according to the fifth embodiment of this invention is explained. The movie capture mode operation of the fifth embodiment is the same as the second embodiment except for a different way of reading out/displaying frames on the LCD 30. Therefore, the movie capture mode operation from steps S61 to S67 in FIG. 14 is the same as the one from steps S11 to S17 in FIG. 8, and their description is omitted.

After the CPU 21 controls the sixth object image to be photographed, its moving image written to the PC card 10 in step S66, and the LCD 30 to be turned on step S67, the CPU 21 controls the first frame 1" to be displayed and the last frame (i.e. the sixth frame 6") simultaneously in the same page of the LCD 30 in step S68 (multiple display). The CPU 21 judges if a predetermined time is elapsed after the first frame 1" and the sixth frame 6" are displayed on the LCD 30 in step S69. If the answer is YES in step S69, the CPU 21 controls the sixth frame 6" to be zoomed-in upon and displayed on the LCD 30 in step S70. If the answer is NO in step S69, the movie capture mode operation returns to reexecute step S69. The CPU 21 further judges if a predetermined time is elapsed after the zoomed six frame 6" is displayed on the LCD 30 in step S71. If the answer is YES in step S71, the CPU 21 controls the LCD 30 to be turned off in step S72.

Referring to FIGS. 15a–15c and 16, a sixth embodiment of the present invention is described. FIGS. 15a–15c and 16 are an explanatory view and a flowchart, respectively, for a continuous shoot mode operation in which multiple static images are consecutively photographed at a predetermined time interval (t) while pushing the release button 23a of the operation unit 23.

FIG. 15a illustrates a view when four object images from the first to fourth frame are consecutively photographed. FIG. 15b illustrates a view when the static image information of the first through fourth frame photographed in FIG. 15a is written to the PC card 10 by the photograph process device. FIG. 15c illustrates a view when the first frame 1" and the last frame (the fourth frame 4") are simultaneously displayed in the same page of the LCD 30 for a predetermined time by the operation of the read out/display device in accordance with the instruction of the display time control device, and the fourth frame 4" is zoomed in on the LCD 30.

Figure 16:
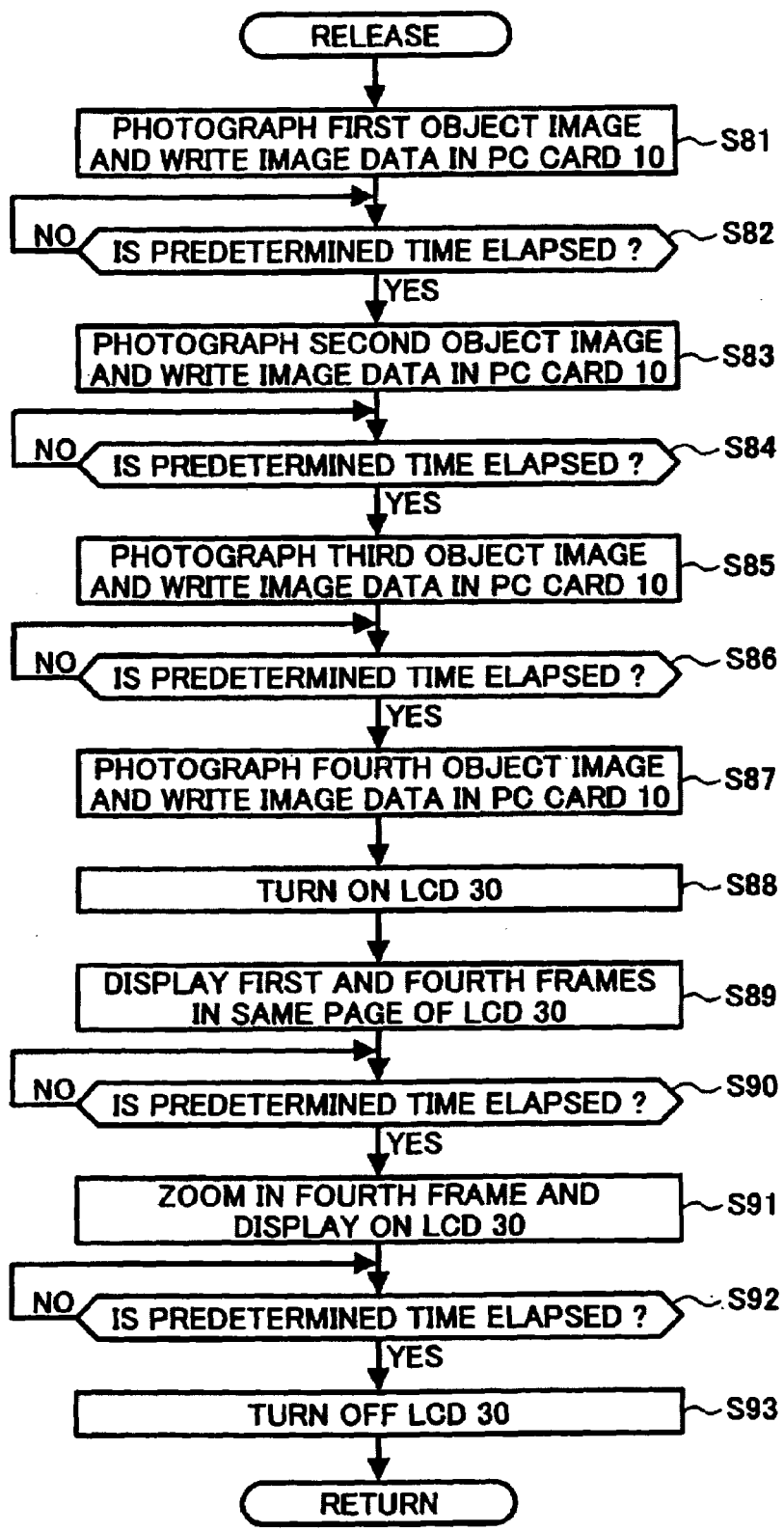
FIG. 16 is a flowchart of process steps that correspond with FIGS. 15a–15c.

Referring to the flowchart in FIG. 16, the continuous shoot mode operation controlled by the CPU 21 of the digital camera according to the sixth embodiment of this invention is explained. The continuous shoot mode operation of the sixth embodiment is the same as the third embodiment except for a different way of displaying frames on the LCD 30. Therefore, the continuous shoot mode operation from steps S81 to S88 in FIG. 16 is substantially the same as the one from steps S31 to S36 in FIG. 10, and so their description is omitted.

After the CPU 21 controls the fourth object image to be photographed, its image information written to the PC card 10 in step S87 and the LCD 30 turned on in step S88, the CPU 21 controls the first frame 1" and the last frame (i.e. the fourth frame 4") to be displayed simultaneously in the same page of the LCD 30 in step S89 (multiple display). The CPU 21 judges if a predetermined time is elapsed after the first frame 1" and the fourth frame 4" are displayed on the LCD 30 in step S90. If the answer is YES in step S90, the CPU 21 controls the fourth frame 4" to be zoomed-in upon and displayed on the LCD 30 in step S91. If the answer is NO in step S90, the continuous shoot mode operation returns before step S90. The CPU 21 further judges if a predetermined time is elapsed after the zoomed fourth frame 4" is displayed on the LCD 30 in step S92. If the answer is YES in step S92, the CPU 21 controls the LCD 30 to be turned off in step S93.

Referring to FIGS. 17a–17c and 18, a seventh embodiment of the present invention is described. FIGS. 17a–17c and 18 are an explanatory view and a flowchart, respectively, for an auto bracketing mode operation in which a same static image is photographed with different predetermined multiple exposure values, e.g., +1.0 EV (exposure value) overexposure, correct exposure, and −1.0 EV underexposure, corresponding to a push operation of the release button 23a of the operation unit 23.

FIG. 17a illustrates a view when three object images from the first to third frame are photographed. FIG. 17b illustrates a view when the static image information of the first through third frame photographed in FIG. 17a is written to the PC card 10 by the photograph process device. FIG. 17c illustrates a view when the three frames (i.e. the first frame 1" of +1.0 EV, (exposure value), overexposure, the second frame 2" of correct exposure, and the third frame 3" of −1.0 EV underexposure) are simultaneously displayed in the same page of the LCD 30 for a predetermined time by the operation of the read out/display device in accordance with the instruction of the display time control device, and the second frame 2" is zoomed in on the LCD 30.

Figure 18:
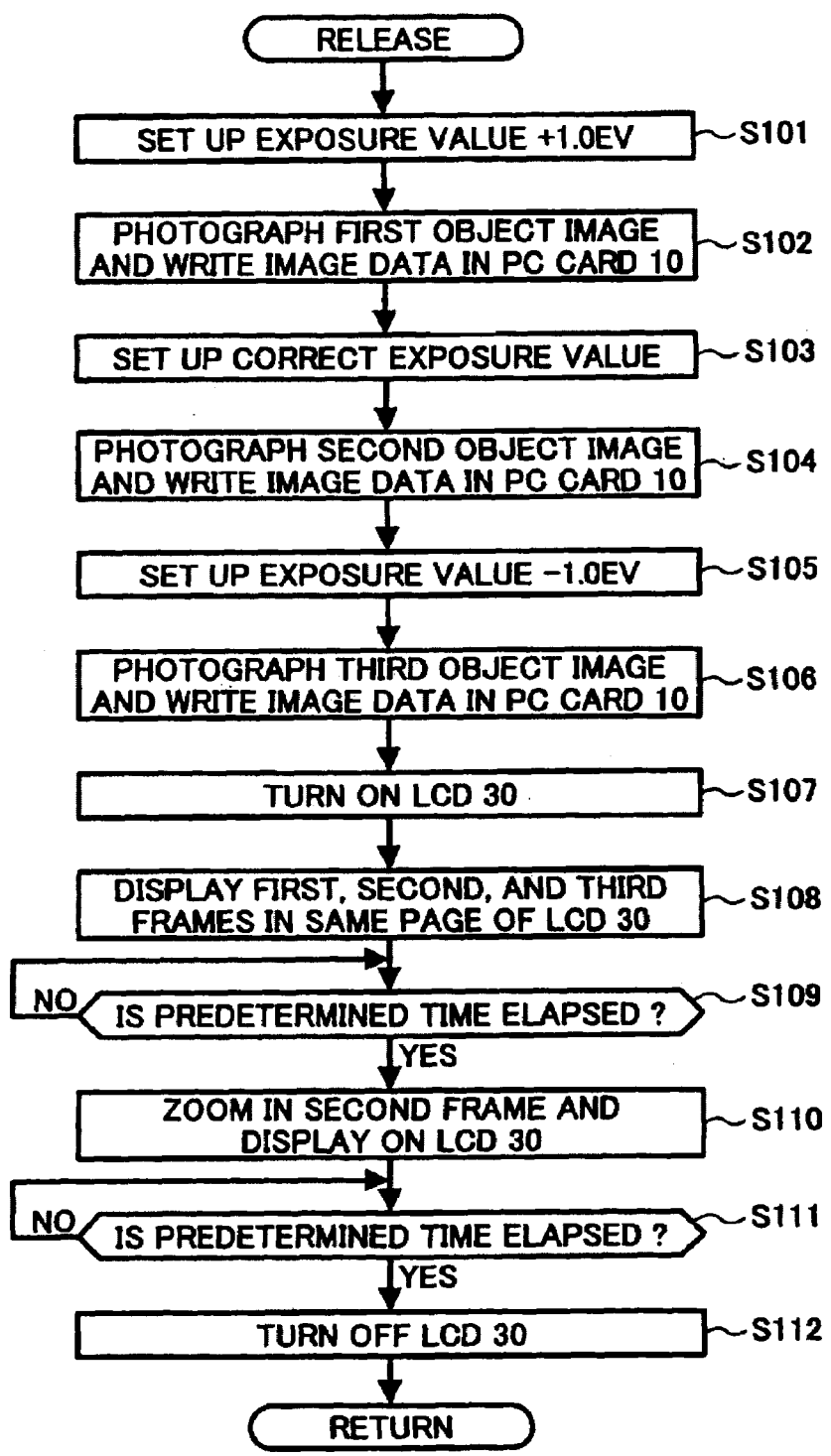
FIG. 18 is a flowchart show process steps that correspond with the operations shown in FIGS. 17a–17c.

Referring to the flowchart in FIG. 18, an auto bracketing mode operation controlled by the CPU 21 of the digital camera according to the seventh embodiment of this invention is explained. The auto bracketing mode operation of the seventh embodiment is the same as the fourth embodiment except for a different way of displaying frames on the LCD 30. Therefore, the auto bracketing mode operation from steps S101 to S107 in FIG. 18 is substantially the same as the one from steps S51 to S57 in FIG. 12, and their description is omitted.

After the CPU 21 controls the third object image to be photographed, its image information is written to the PC card 10 in step S106, and the LCD 30 is turned on in step S107, the CPU 21 controls to display the first frame 1", the middle second frame 2", and the last frame (i.e. the third frame 3") to be simultaneously displayed in the same page of the LCD 30 in step S108. The CPU 21 judges if a predetermined time is elapsed after the first through three frames are displayed on the LCD 30 in step S109. If the answer is YES in step S109, the CPU 21 controls to zoom in the second frame 2" and display on the LCD 30 in step S110. If the answer is NO in step S109, the auto bracketing mode operation returns to reexecute step S109. The CPU 21 further judges if a predetermined time is elapsed after the zoomed second frame 2" is displayed on the LCD 30 in step S111. If the answer is YES in step S111, the CPU 21 controls the LCD 30 to turn off in step S112.

As described above, according to the first through seven embodiments, the photographed image is controlled to be displayed automatically on the LCD 30 for an operator's inspection and the LCD 30 is controlled to be turned off automatically after a predetermined time. Therefore, the digital camera of the present invention can reduce power consumption and extend a battery life. In addition, because an operator does not need to switch to display the LCD 30 to check the photograph result each time the operator takes a photograph, the digital camera of the present invention can achieve convenience of operation in various photographing modes while saving power.

In the above-described first through seven embodiments, an operator can change the display time for the photographed image on the LCD 30 as desired, for example, a few seconds or several tens of seconds.

Further, when the operator does not need to check the result of photograph or the operator predicts that the battery 28 is becoming weak, the operator can set the camera such that the photographed image is not automatically displayed on the LCD 30. Alternatively, when the operator needs to read out/display the photographed image written to the PC card 10 on the LCD 30, the operator can continuously display the image on the LCD 30. In this case, the digital camera is often used in a room with outlets for utility AC power and uses not the battery 28 but an AC adapter as a power source.

Furthermore, in either one of the above-described movie capture mode, continuous shoot mode, and auto bracketing mode, the number of frames photographed by one operation, the number of frames to be displayed on the LCD 30, or the number of multiple frames to be displayed in a page of the LCD 30 can be set to any desired number.

Although the frame is zoomed to be displayed on the LCD 30 in the fifth through seventh embodiments, the zooming operation is not necessarily required after multiple frames are displayed in a page of the LCD 30.

The processes set forth in the present description may be implemented using a conventional general purpose microprocessor programmed according to the teachings of the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. The storage medium can include, but is not limited to, any type of disk including floppy disk, optical disk, CD-ROMS, and magneto-optical disks, ROMS, RAMs, EPROMs, EEPROMs, flash memory, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein. This document claims priority and contains subject matter related to Japanese Patent Application No. 10-294317 filed in the Japanese Patent Office on Oct. 15, 1998, and Japanese Patent Application No. 11-247234 filed in the Japanese Patent Office on Sep. 1, 1999, the entire contents of which are hereby incorporated by reference.

The invention claimed is:

1. A digital camera, comprising:
an imaging device configured to convert an optical object image focused through an photographic optical system into image information;
a recording medium configured to have said image information written thereto;
an operator controlled operation device configured to enable an operator to set photographing instructions;
a photograph process device configured to write the image information in the recording medium after processing the image information according to the photographing instructions;
a read out/display device configured to read out the image information written in the recording medium and display the image information;
a mode selection device configured to enable said operator to select a movie capture mode of operation in which the image information includes moving images photographed as successive images while the operation device is operated; and
a display time control device configured to automatically turn on the read/out display device, without user input, after the photograph process device writes the image information in the recording medium and configured to operate the read out/display device for a predetermined time so as to read out and display at least two frames of the successive images in the movie capture mode after the photograph process device writes the image information consecutively in the recording medium.

2. The digital camera according to claim 1, wherein:
said at least two frames being a first frame and a last frame of said successive images, said first frame and said last frame being sequentially displayed.

3. The digital camera according to claim 1, wherein:
said at least two frames being a first frame and a last frame of said successive images, said first frame and said last frame being displayed on a same page of the read out/display device.

4. The digital camera according to claim 1, wherein:
said operator controlled operation device being configured to enable the operator to set a duration of said predetermined time.

5. The digital camera according to claim 1, wherein:
said display time control device being configured to be disabled such that said at least one of said at least two frames are continuously displayed.

6. The digital camera according to claim 1, wherein:
said read out/display device includes a liquid crystal display.

7. The digital camera according to claim 1, wherein:
the display time control device is configured to turn off the read out/display device, without user input, when the predetermined time has elapsed.

8. A digital camera, comprising:
an imaging device configured to convert an optical object image focused through an photographic optical system into image information;

a recording medium configured to have said image information written thereto;

an operator controlled operation device configured to enable an operator to set photographing instructions;

a photograph process device configured to write the image information in the recording medium after processing the image information according to the photographing instructions;

a read out/display device configured to read out the image information written in the recording medium and display the image information;

a mode selection device configured to enable said operator to select a normal photographing mode in which the image information includes a single static image photographed each time an operator reactuates the operation device, and a movie capture mode in which the image information includes moving images photographed as successive images while the operation device is continuously actuated;

a display time control device configured to automatically turn on the read/out display device, without user input, after the photograph process device writes the image information in the recording medium, configured to operate the read out/display device for a predetermined time so as to read out and display the single static image that was last taken when in said normal photographing mode, and configured to operate said read out/display device for another predetermined time so as to read out and display at least two frames of the successive images when in said movie capture mode.

9. The digital camera according to claim 8, wherein:
said operator controlled operation device being configured to enable the operator to set a duration of said predetermined time and said another predetermined time.

10. The digital camera according to claim 8, wherein:
said display time control device being configured to be disabled such that said at least one of said single static image and said at least two frames are continuously displayed.

11. The digital camera according to claim 8, wherein:
said read out/display device includes a liquid crystal display.

12. The digital camera according to claim 8, wherein:
the display time control device is configured to turn off the read out/display device, without user input, when the predetermined time has elapsed if in said normal photographing mode and when the another predetermined time has elapsed if in said movie capture mode.

13. A digital camera, comprising:
an imaging device configured to convert an optical object image focused through an photographic optical system into image information;

a recording medium configured to have said image information written thereto;

an operator controlled operation device configured to enable an operator to set photographing instructions;

a photograph process device configured to write the image information in the recording medium after processing the image information according to the photographing instructions;

a read out/display device configured to read out the image information written in the recording medium and display the image information;

a mode selection device configured to enable said operator to select a continuous shoot mode of operation in which the image information includes multiple static images consecutively photographed but separated in time by a predetermined time interval while operating the operation device; and a display time control device configured to automatically turn on the read/out display device, without user input, after the photograph process device writes the image information in the recording medium and configured to operate the read out/display device for a predetermined time so as to read out and display at least two frames of the multiple static images when in the continuous shoot mode of operation.

14. The digital camera according to claim 13, wherein:
said at least two frames being a first frame and a last frame of said successive images, said first frame and said last frame being sequentially displayed.

15. The digital camera according to claim 13, wherein:
said at least two frames being a first frame and a last frame of said successive images, said first frame and said last frame being displayed on a same page of the read out/display device.

16. The digital camera according to claim 13, wherein:
said operator controlled operation device being configured to enable the operator set a duration of said predetermined time.

17. The digital camera according to claim 13, wherein:
said display time control device being configured to be disabled such that said at least one of said at least two frames are continuously displayed.

18. The digital camera according to claim 13, wherein:
said read out/display device includes a liquid crystal display.

19. The digital camera according to claim 13, wherein:
the display time control device is configured to turn off the read out/display device, without user input, when the predetermined time has elapsed.

20. A digital camera, comprising:
an imaging device configured to convert an optical object image focused through an photographic optical system into image information;

a recording medium configured to have said image information written thereto;

an operator controlled operation device configured to enable an operator to set photographing instructions;

a photograph process device configured to write the image information in the recording medium after processing the image information according to the photographing instructions;

a read out/display device configured to read out the image information written in the recording medium and display the image information;

a mode selection device configured to enable said operator to select a normal photographing mode in which the image information includes a single static image photographed each time an operator reactuates the operation device, and a continuous shoot mode, when the operator continuously operates the operation device, in which the image information includes multiple static images consecutively photographed but separated from one another by a predetermined time period; and a display time control device configured to automatically turn on the read/out display device, without user input, after the photograph process device writes the image information in the recording medium, configured to operate the read out/display device for a predetermined time so as to read out and display the single static image that was last taken when in said normal photographing mode, and configured to operate said read out/display device for another predetermined time so as to read out and display at least two of the multiple static images when in said continuous shoot mode.

21. The digital camera according to claim 20, wherein: said operator controlled operation device being configured to enable the operator to set a duration of said predetermined time and said another predetermined time.

22. The digital camera according to claim 20, wherein: said display time control device being configured to be disabled such that said at least one of said single static image and said at least two of the multiple static images are continuously displayed.

23. The digital camera according to claim 20, wherein: said read out/display device includes a liquid crystal display.

24. The digital camera according to claim 20, wherein: the display time control device is configured to turn off the read out/display device, without user input, when the predetermined time has elapsed if in said photographing mode and when the another predetermined time has elapsed if in said continuous shoot mode.

25. A digital camera, comprising:
an imaging device configured to convert an optical object image focused through an photographic optical system into image information;
a recording medium configured to have said image information written thereto;
an operator controlled operation device configured to enable an operator to set photographing instructions;
a photograph process device configured to write the image information in the recording medium after processing the image information according to the photographing instructions;
a read out/display device configured to read out the image information written in the recording medium and display the image information;
a mode selection device configured to enable said operator to select an auto bracketing mode in which the image information includes a same static image photographed in multiple static frames, said static frames having different predetermined exposure values as controlled by said operating device; and
a display time control device configured to automatically turn on the read/out display device, without user input, after the photograph process device writes the image information in the recording medium and configured to operate the read out/display device for a predetermined time so as to read out and display a static frame of the multiple static frames when in the auto bracketing mode.

26. The digital camera of according to claim 25, wherein: the read out/display device is also configured to display a second static frame of the of the multiple static frames, said multiple static frames being three frame in total.

27. The digital camera according to claim 25, wherein: said operator controlled operation device being configured to enable the operator to set a duration of said predetermined time.

28. The digital camera according to claim 25, wherein: said display time control device being configured to be disabled such that at least one of said static frame and said second static frame being continuously displayed.

29. The digital camera according to claim 25, wherein: said read out/display device includes a liquid crystal display.

30. The digital camera according to claim 25, wherein: the display time control device is configured to turn off the read out/display device, without user input, when the predetermined time has elapsed.

31. A digital camera, comprising:
an imaging device configured to convert an optical object image focused through an photographic optical system into image information;
a recording medium configured to have said image information written thereto;
an operator controlled operation device configured to enable an operator to set photographing instructions;
a photograph process device configured to write the image information in the recording medium after processing the image information according to the photographing instructions;
a read out/display device configured to read out the image information written in the recording medium and display the image information;
a mode selection device configured to enable said operator to select a normal photographing mode in which the image information includes a single static image photographed each time an operator reactuates the operation device, and an auto bracketing mode in which the image information includes a same static image photographed in multiple frames with different predetermined exposure values set by said photographing instructions; and
a display time control device configured to automatically turn on the read/out display device, without user input, after the photograph process device writes the image information in the recording medium, configured to operate the read out/display device for a predetermined time so as to read out and display a single static image that was last taken when in said normal photographing mode, and configured to operate said read out/display device for another predetermined time so as to read out and display a frame of said multiple frames when in said auto bracketing mode.

32. The digital camera according to claim 31, wherein: said operator controlled operation device being configured to enable the operator to set a duration of said predetermined time and said another predetermined time.

33. The digital camera according to claim 31, wherein: said display time control device being configured to be disabled such that said at least one of said single static image and a frame of said multiple frames is continuously displayed.

34. The digital camera according to claim 31, wherein: said read out/display device includes a liquid crystal display.

35. The digital camera according to claim 31, wherein: the display time control device is configured to turn off the read out/display device, without user input, when the predetermined time has elapsed if in said normal photographing mode and when the another predetermined time has elapsed if in said auto bracketing mode.

36. A digital camera, comprising:
means for converting an optical object image focused through an photographic optical system into image information;
means for recording said image information;
means for enabling an operator to set photographing instructions;

means for writing the image information in the recording medium after processing the image information according to the photographing instructions;

means for reading out and displaying the image information written in the recording medium;

means for selecting at least one of a normal photographing mode in which the image information includes a single static image photographed each time an operator reactuates an operation device, an auto bracketing mode in which the image information includes a same static image photographed in multiple frames with different predetermined exposure values set by said photographing instructions, a movie capture mode in which the image information includes moving images photographed as successive images, and a continuous shoot mode in which the image information includes multiple static images consecutively photographed but separated in time by a predetermined time interval; and means for automatically turning on the means for reading out and displaying without user input and after the means for writing writes the image information in the recording medium, and for controlling the means for reading out and displaying for a first predetermined time so as to read out and display a single static image that was last taken when in said normal photographing mode, read out and display for a second predetermined time a frame of said multiple frames when in said auto bracketing mode, read out and display for a third predetermined time said at least two frames of said successive images when in said movie capture mode, and read out and display for a fourth predetermined time said at least two frames of the multiple static images when in the continuous shoot mode of operation.

37. The digital camera according to claim 36, further comprising:

means for turning off the means for reading out and displaying, without user input, when the first predetermined time has elapsed if in said normal photographing mode, when the second predetermined time has elapsed if in said auto bracketing mode, when the third predetermined time has elapsed if in said movie capture mode, and when the fourth predetermined time has elapsed if in the continuous shoot mode of operation.

38. A digital camera, comprising:

means for capturing during a first time period an electronic representation of a plurality of recordable images of an object;

means for recording during a second time period the electronic representation of said plurality of recordable images in a computer readable medium;

means for automatically turning on a display, without user input, after the means for recording records said electronic representation of said plurality of recordable images, reading out a portion of said electronic representation of said plurality of recordable images, and displaying on said display during a third time period at least one image that corresponds with the portion of said electronic representation of said recordable images.

39. The digital camera according to claim 38, further comprising:

means for selecting a mode of operation that controls conditions under which the electronic representation of the plurality of recordable images are captured.

40. The digital camera according to claim 39, wherein:

said means for selecting includes means for selecting a normal photographing mode in which separate static images are captured each time an operator actuates a means for capturing an image; and said means for automatically turning on a display includes means for displaying a first and a last of said separate static images captured in an imaging sequence.

41. The digital camera according to claim 39, wherein:

said means for selecting includes means for selecting an auto bracketing mode in which a same static image is photographed in multiple frames with different predetermined exposure values set by means for setting photographing instructions; and said means for automatically turning on a display includes means for displaying said static image at a predetermined on of said exposure values.

42. The digital camera according to claim 39, wherein:

said means for selecting includes means for selecting a movie capture mode where moving images are photographed as successive images; and said means for automatically turning on a display includes means for displaying a first and a last moving image of a sequence of moving images.

43. The digital camera according to claim 39, wherein:

said means for selecting includes means for selecting a continuous shoot mode where multiple static images are consecutively photographed but separated in time by a predetermined time interval; and said means for automatically turning on a display includes means for displaying a first and a last of said multiple static images.

44. The digital camera according to claim 38, further comprising:

means for turning off the display, without user input, when the third time period has elapsed.

45. A method for displaying a photograph on a display of a digital camera, comprising:

converting an optical object image focused through an photographic optical system into image information;

recording said image information in a recording medium;

setting photographing instructions;

writing the image information in the recording medium after processing the image information according to the photographing instructions;

reading out and displaying on a display the image information written in the recording medium;

selecting at least one of a normal photographing mode in which the image information includes a single static image photographed each time an operator reactuates an operation device, an auto bracketing mode in which the image information includes a same static image photographed in multiple frames with different predetermined exposure values set by said photographing instructions, a movie capture mode in which the image information includes moving images photographed as successive images, and a continuous shoot mode in which the image information includes multiple static images consecutively photographed but separated in time by a predetermined time interval; and controlling the display so as to automatically turn on the display, without user input, after the writing of the image information and so as to display for a first predetermined time, a single static image that was last taken when in said normal photographing mode, display for a second predetermined time a frame of said multiple frames when in said auto bracketing mode, display for a third predetermined time said at least two frames of said successive images when in said movie capture mode, and display for a fourth predetermined time said at least two frames of the multiple static images when in the continuous shoot mode of operation.

46. The method according to claim 45, further comprising:
turning off the display, without user input, when the first predetermined time has elapsed if in said normal photographing mode, when the second predetermined time has elapsed if in said auto bracketing mode, when the third predetermined time has elapsed if in said movie capture mode, and when the fourth predetermined time has elapsed if in the continuous shoot mode of operation.

47. A method for displaying an image on a display of a digital camera, comprising:
capturing during a first time period an electronic representation of a plurality of recordable images of an object;
recording during a second time period the electronic representation of said plurality of recordable images in a computer readable medium;
turning on automatically a display, without user input, after the recording of the electronic representation of said plurality of recordable images, reading out a portion of said electronic representation of said plurality of recordable images, and displaying on said display during a third time period at least one image that corresponds with the portion of said electronic representation of said recordable images.

48. The method according to claim 47, further comprising:
selecting a mode of operation that controls conditions under which the electronic representation of the plurality of recordable images are captured.

49. The method according to claim 48, wherein:
said selecting includes selecting a normal photographing mode in which separate static images are captured each time an operator actuates a mechanism for capturing an image; and
said turning on automatically the display includes displaying a first and a last of said separate static images captured in an imaging sequence.

50. The method according to claim 48, wherein:
said selecting includes selecting an auto bracketing mode in which a same static image is photographed in multiple frames with different predetermined exposure values set by a mechanism for setting photographing instructions; and
said turning on automatically the display includes displaying said static image at a predetermined on of said exposure values.

51. The method according to claim 48, wherein:
said selecting includes selecting a movie capture mode where moving images are photographed as successive images; and
said turning on automatically the display includes displaying a first and a last moving image of a sequence of moving images.

52. The method according to claim 48, wherein:
said selecting includes selecting a continuous shoot mode where multiple static images are consecutively photographed but separated in time by a predetermined time interval; and
said turning on automatically the display includes displaying a first and a last of said multiple static images.

53. The method according to claim 47, further comprising:
turning off the display, without user input, when the third time period has elapsed.

* * * * *